United States Patent [19]

Daigle et al.

[11] Patent Number: 4,468,726
[45] Date of Patent: Aug. 28, 1984

[54] OPTICALLY-TRIGGERED HALF-FREQUENCY AC CONVERTER

[75] Inventors: Louis J. L. Daigle; Donald C. Paine, both of Manchester; Anthony J. Bednarczyk, Glastonbury, all of Conn.

[73] Assignee: United Technologies Corporation, Hartford, Conn.

[21] Appl. No.: 376,899

[22] Filed: May 10, 1982

[51] Int. Cl.³ .......................................... H02M 5/257
[52] U.S. Cl. .................................. 363/161; 318/313; 323/902
[58] Field of Search ........................... 363/8, 160–162, 363/165; 318/313, 771; 328/25; 323/902; 250/205, 551

[56] References Cited

U.S. PATENT DOCUMENTS

| | | | |
|---|---|---|---|
| 3,274,482 | 9/1966 | Depenbrock | 363/162 X |
| 3,479,562 | 11/1969 | Cleveland | 250/205 X |
| 3,659,187 | 4/1972 | Lamorlette | 318/313 X |
| 3,691,440 | 9/1972 | Haddock | 318/313 |
| 3,718,854 | 2/1973 | Spyron et al. | 363/160 X |

*Primary Examiner*—Peter S. Wong
*Attorney, Agent, or Firm*—Richard P. Lange

[57] ABSTRACT

An optically-triggered converter directly changes the frequency of an incoming voltage waveform to half frequency thereby causing an induction motor, driving a ventilation fan or the like, to operate at half speed. At this lower speed, the induction motor consumes significantly less power. A center-tapped power transformer is used to lower the magnitude of the incoming voltage waveform and a number of optically-triggered thyristor switches are connected between the transformer secondary and the induction motor. The novel trigger circuit includes a synchronous motor connected to receive the input voltage waveforms so that a cylinder attached thereto is rotated in synchronism with the input voltage waveforms. The optically-triggered thyristors are circumferentially positioned about the rotating cylinder and are triggered by a light pulse emerging through an aperture in the cylinder sidewall. The arrangement of the thyristors around the cylinder is selected so that the thyristors are enabled in a predetermined sequence forming fundamental three-phase half-frequency waveforms which are then presented to the induction motor.

5 Claims, 4 Drawing Figures

OPTICALLY-TRIGGERED HALF-FREQUENCY AC CONVERTER

DESCRIPTION

This application contains subject matter related to noncopending U.S. patent application Ser. No. 095,768, filed Nov. 19, 1979, now abandoned, and U.S. patent application Ser. No. 308,634 filed Oct. 5, 1981, both assigned to the same assignee as the present patent application.

Technical Field

This invention relates to a power saving circuit for use with an AC induction motor and, more specifically to an optically-triggered circuit which converts 60 Hertz line power to 30 Hertz line power for operating an AC induction motor at half its rated speed thereby significantly reducing the consumed power.

Background Art

Induction motors are known generally and have been used for many years in numerous devices, one such use being in ventilating and air-conditioning systems to drive fans or the like. Most often the size of a fan motor in such a system is selected so that it is matched to the maximum amount of air which must be moved through a given size of duct work to achieve the necessary cooling in a building. This approach is particularly wasteful of electrical energy in that the maximum airflow to cool a building is only required for a small percentage of the time, e.g., on the hottest days of the year. However, most of the period the system could provide a much lower flow of air to maintain a comfortable temperature level within the various areas of the building. A considerable savings in electrical power would result where the ventilation system could be quickly and conveniently switched between a higher and lower airflow when minimum cooling is required.

Probably the best known way to reduce the amount of electrical energy consumed by any motor is to turn that motor off, at least for part of the time. Where the motor drives the fans of a ventilating system, a modification of this off/on technique would be to employ duty cycle modulation so that the ventilation system in a given period of time is operated at full capacity during a first portion of the given time period and then turned off during the remaining portion of the given period. This approach has proven unsatisfactory in many situations for a number of reasons. First, in a given area of a building, or the like, duty cycle variation of the ventilating system often causes unacceptably wide temperature variations. Secondly, the on/off cycling of ventilation fans tends to create uncomfortable drafts. Another reason is that there is often a certain noise level associated with a ventilation system because of the movement of the air through the duct work, motor and fan noise, etc., thus the off/on cycling of the ventilation system causes a variation in this noise level which can be disconcerting to the building occupants. Finally, and most important from an energy conservation viewpoint, is that the system losses in a ventilating system, this being the loss related to such things as airflow through each duct, motor and associated drive components, etc., are greatest when the system is operating at its maximum rated capacity, i.e., during maximum airflow. Thus, a significant reduction in system losses occurs if the volume of air moved through the ventilation system at any one time is reduced.

Numerous attempts have been made to create an economically feasible method to operate an AC induction motor at both a high speed and a low speed. One method has been to purchase a factory manufactured, two-speed motor for driving a ventilation fan which includes dual windings on the stator portion of the motor. One set of windings is electrically energized for operating at the higher speed while electrical power is switched to the second set of windings for operation at a lower speed. Although this system has a two-speed capability, the cost of a dual winding induction motor and a special magnetic starter can be considerable, particularly in the situation where the ventilating system includes a large number of induction motors and the individual induction motors are the large expensive three-phase type.

In other situations where it is desirable to have a two-speed operating capability for the fans of a ventilation system, another approach has been to use two separate motors—a high-speed motor and a low-speed motor. During the time when the higher flow through the ventilation system is desirable, the high-speed motor would be coupled to each fan through a mechanical belt drive system, or the like. When the airflow requirements can be lowered, the lower speed motor is then coupled to the fan through the belt drive system. As is apparent, this technique requires the expense of two separate motors for each fan in addition to a belt drive system, or other switchable power coupler, which must be capable of allowing the two motors to be alternately coupled to the loads.

Yet another approach for reducing the speed of an AC induction motor coupled to a ventilating fan is to use a rectifier-inverter circuit. The rectifier circuit converts the incoming AC electrical energy to DC electrical energy. The inverter, which includes a suitable control circuit, then transforms the DC electrical energy back into AC electrical energy of a desired frequency for operating the induction motor at the desired speed. This approach also tends to be expensive due to the expense associated with the rectifier and the inverter and many of these systems reflect radio frequency interface back into the power lines or radiate radio frequency energy directly.

Yet another approach to changing the speed of an AC induction motor is to directly change the frequency of the incoming AC electrical power to a lower frequency so that the motor will operate at a lower speed. U.S. Pat. No. 3,710,218 issued July 9, 1973, to C. Roundy et al for "Induction Motor Speed Control" describes a circuit used with an AC induction motor which controls the frequency of the voltage waveform applied to the stator. In one embodiment for a single-phase motor, illustrated in FIG. 3 of that patent, there is disclosed a circuit which utilizes a standard 60 Hertz input power waveform to drive an induction motor at half speed. The control circuitry causes the circuit to skip the second, fourth, eighth, etc., pulse, pass the first, fifth, ninth, etc., pulse and invert the third, seventh, and eleventh pulse to create a resemblance of a 30 Hertz waveform. In addition to the complexity of this circuit which makes it particularly expensive, this circuit can cause considerable radio interference to be induced into the AC power lines. This results from transitioning the thyristors to their conductive state when there is sufficient cathode-to-anode voltage to cause a current surge through the thyristor.

DISCLOSURE OF INVENTION

The present invention relates to an improved circuit configuration for reducing the power consumed by an AC induction motor by directly converting the frequency of the input power to a lower frequency thereby lowering power consumption.

In accordance with a particular feature of the present invention, an AC induction motor operating the fans in a ventilation system can be switched from one speed to a lower speed to save energy when less airflow is needed from the ventilation system.

According to another feature of the present invention a two-speed circuit for an AC induction motor(s) in a ventilation system, or the like, significantly reduces the amount of power consumed by the ventilation system. This power saving occurs because under most conditions the ventilation system can be operated at the lower speed where duct losses, motor, and fan, etc., are proportionately much less, thereby increasing the overall system efficiency.

According to still another feature of the present invention a speed reduction circuit for an AC induction motor utilizes a center-tapped transformer in conjunction with a simple optically-triggered circuit to change the frequency of electrical power to the motor. The center-tapped transformer provides a voltage waveform which has both a lower amplitude and an out-of-phase signal to form the half frequency basic signal waveform. The optical trigger circuit is driven by a synchronous motor connected to the input terminals to actuate the thyristors. The distinctive sequence of pulses presented to the thyristors forms a half-frequency voltage waveform allowing the three-phase AC induction motor to operate at the lower speed.

The foregoing and other objects, features and advantages of the present invention will become more apparent from the following description of preferred embodiments and accompanying drawings.

BEST MODE FOR CARRYING OUT THE INVENTION

Figure 1:
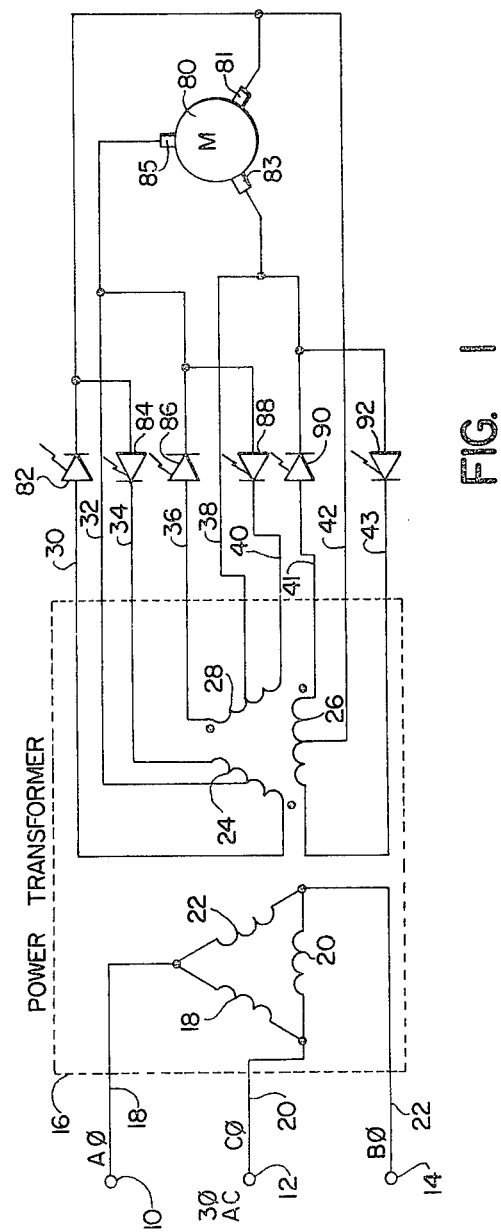
Fig. 1 is a diagram in a schematic form illustrating the optically-triggered half-frequency converter according to the present invention for operating a three-phase AC induction motor at one-half of its speed.
Figure 2:
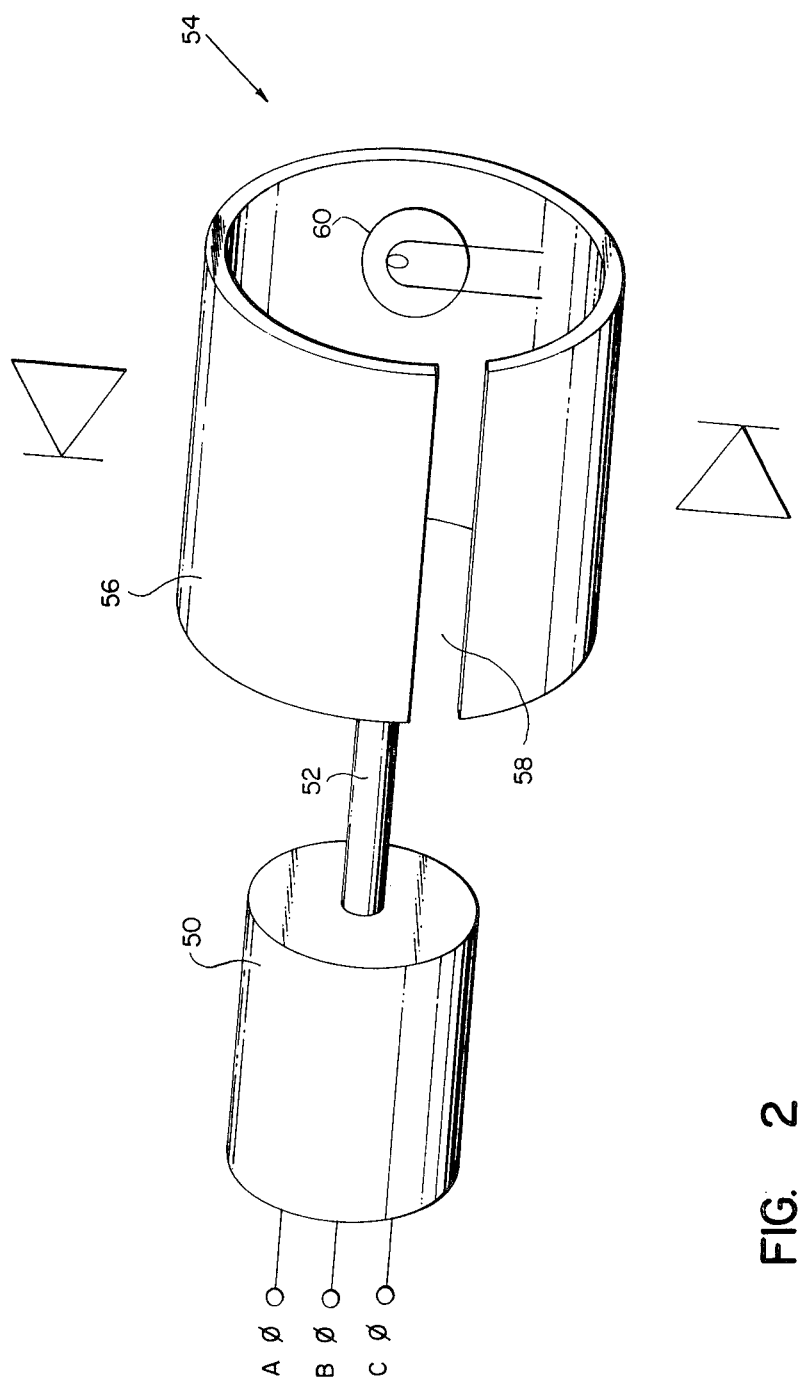
FIG. 2 is a view depicting one embodiment of an optical trigger circuit used in the present invention to enable the thyristors.

Referring initially to FIG. 1, there is seen one embodiment according to the present invention for operating an AC induction motor at half its rated speed thereby significantly reducing the consumed power. The circuit is provided with an input terminal 10, an input terminal 12, and an input terminal 14, to which may be connected a suitable AC electric power source (not shown), one such source providing a 440 volt three-phase waveform at a frequency of 60 Hertz. A power transformer 16 is connected to the AC source via leads 18, 20, and 22. The transformer 16 can be a conventional transformer with a center-tapped secondary and the power rating of the transformer should be matched to that of the AC induction motor or motors at the reduced speed. The transformer 16 includes primary windings 18, 20, and 22 which are connected in a delta configuration across the leads 18, 20, and 22. Also included in the transformer 16 are secondary windings 24, 26 and 28, each being magnetically coupled to primary winding 18, primary winding 20, and primary winding 22, respectively. As mentioned, each of the secondary windings of the transformer 16 is center-tapped to provide a voltage waveform whose magnitude and phase are suitable to drive the induction motor, the reasons for which will be more apparent hereinafter. It should be noted that the transformer 16 could be either a single three-phase transformer or three single-phase transformers so long as the secondary windings include a center-tap.

The secondary windings of the transformer 16 in this embodiment are not connected to each other. However, the voltage waveforms from the secondary winding 24 appears at the transformer output on leads 30, 32, and 34, the voltage waveforms from the secondary winding 28 appear at the transformer output on the lines 36, 38, and 40, and the voltage waveforms from the secondary winding 26 appear at the transformer output on the lines 41, 42, and 43. One three-phase induction motor 80, or as many as are desired to be operated at a lower speed, are then connected to the output of the transformer 16 as follows. First, the center-tap terminal of each secondary winding is directly connected by the leads 32, 38, and 42. Then a plurality of optically-triggered solid state switches, such as thyristors 82, 84, 86, 88, 90, and 92, are provided and since each optically-triggered thyristor is unidirectional, the switches are connected in pairs across each of the secondary windings. Optically-triggered thyristors, developed by the General Electric Company have been used in inverters, particularly in conjunction with high voltage inverters used together with DC power transmission lines. The three-phase induction motor 80 includes input terminals 81, 83, and 85, and the input terminal 85 is directly connected to the center-tap of the secondary winding 24 and is also connected to one end of the secondary winding 28 through the thyristor 88. The other end of the secondary winding 28 is also connected to the terminal 85 but through the thyristor 86. Similarly, the input terminal 83 of the three-phase induction motor 80 is directly connected to the center-tap of the secondary winding 28, and, at the same time, is connected to one end of the secondary winding 26 through the thyristor 90. The other end of the secondary winding 26 is also connected to the input terminal 83 but through the thyristor 92. In a similar fashion, the input terminal 81 of the three-phase induction motor 80 is connected directly to the center-tap of the secondary winding 26, and it is also connected through the thyristor 82 to one end of the secondary winding 24 and to the other end of the secondary winding 24 through the thyristor 84.

The present invention further includes a simple optical trigger circuit for actuating the thyristor switches in a particular sequence. The trigger circuit includes a motor 50, such as a four-pole synchronous motor often used in clocks or the like, connected to the input lines 18, 20, and 22 to receive the incoming AC voltage waveforms. forms. A shaft 52 has a cylinder 54 mounted thereon so that it rotates at a predetermined RPM under precise phase control of the incoming voltage waveforms. The sidewall 56 of the cylinder has one axially extending slit 58 therethrough which is of a predetermined width. A light source 60 is located inside of the cylinder 54. The optically-gated thyristors are positioned circumferentially adjacent the outside of the cylinder 54 so that each time the slit 58 is aligned between the light source and the location of one of the thyristors, the light energy passes therethrough to enable that particular thyristor.

As mentioned briefly herebefore, a particular feature of the present invention is one or more conventional single speed AC induction motors driving a load, such as the ventilation fans of an air-conditioning and/or heating system or the like, can be operated at rated load capacity when maximum airflow is required but switched to half speed when half of the amount of air is acceptable. At the lower speed the ventilating fans would consume considerably less AC electrical energy in theory, if the speed is reduced by one-half, then the power consumption is reduced to one-eighth. Thus, the present invention acts both as an energy conservation measure and also as a cost reduction measure. The circuit configuration of the present invention achieves this result through the use of a conventional center-tapped transformer in conjunction with a plurality of optically-triggered solid state switches, and a novel optical triggering circuit. This technique directly converts the frequency of the incoming voltage waveform directly to a half-frequency waveform and also reduces the magnitude of the voltage waveform by approximately one-half. Accordingly, the lower frequency causes the motor to operate at a lower RPM while the lower voltage prevents the motor from drawing excessive current as a result of the lower motor impedance during the low frequency operation. The operation of the circuit embodiment illustrated in FIG. 1 can best be understood with reference to the waveforms shown in FIG. 4. As is seen in illustration (a) of FIG. 4, the voltage waveforms on the lines 10, 12, and 14 are typical for three-phase 60 Hertz AC electrical power. The waveform on each line is displaced from the voltage waveforms on adjacent input lines by 120 electrical degrees. For example, in illustration (a), voltage waveform 100 could be the voltage waveform on the line 18, the waveform 102 is the voltage waveform on the line 20 and the waveform 104 the waveform on the line 22.

Figure 3:
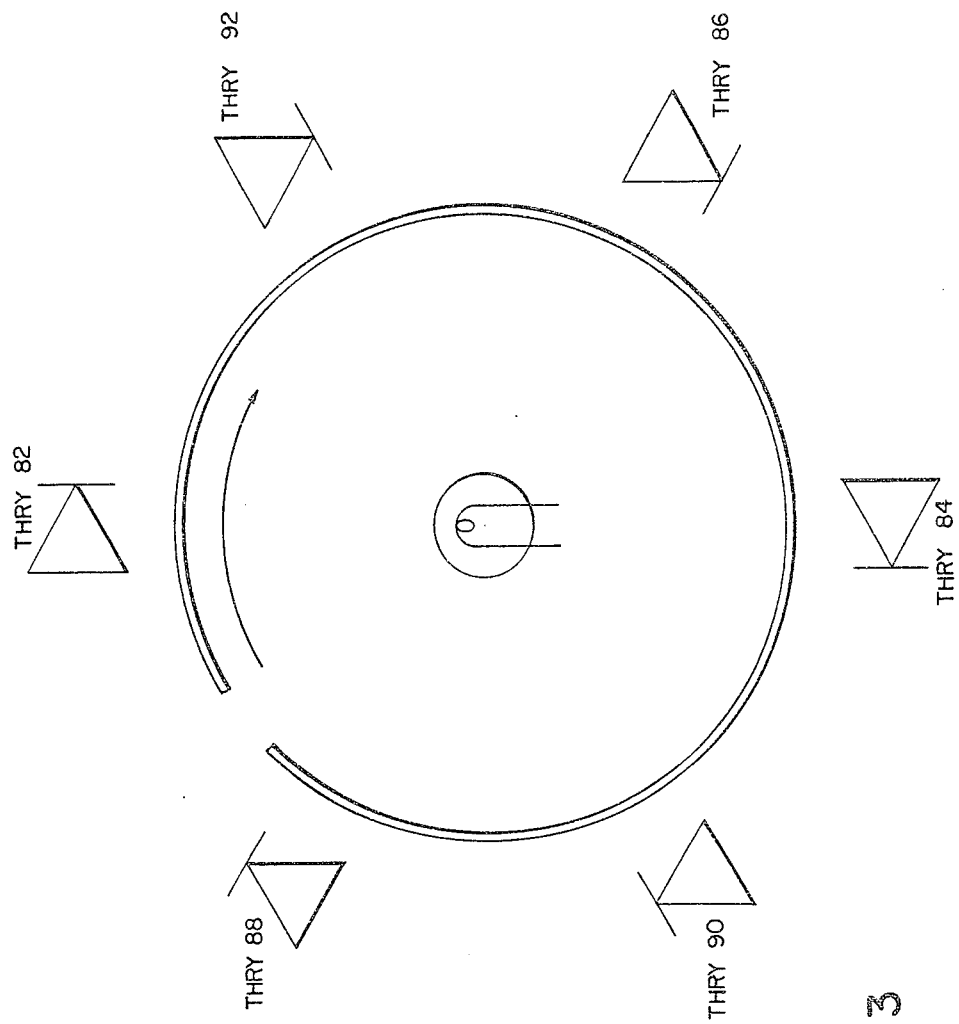
FIG. 3 is an end view of the optical trigger circuit of Fig. 2 and specifically depicts the firing order of the thyristors.
Figure 4:
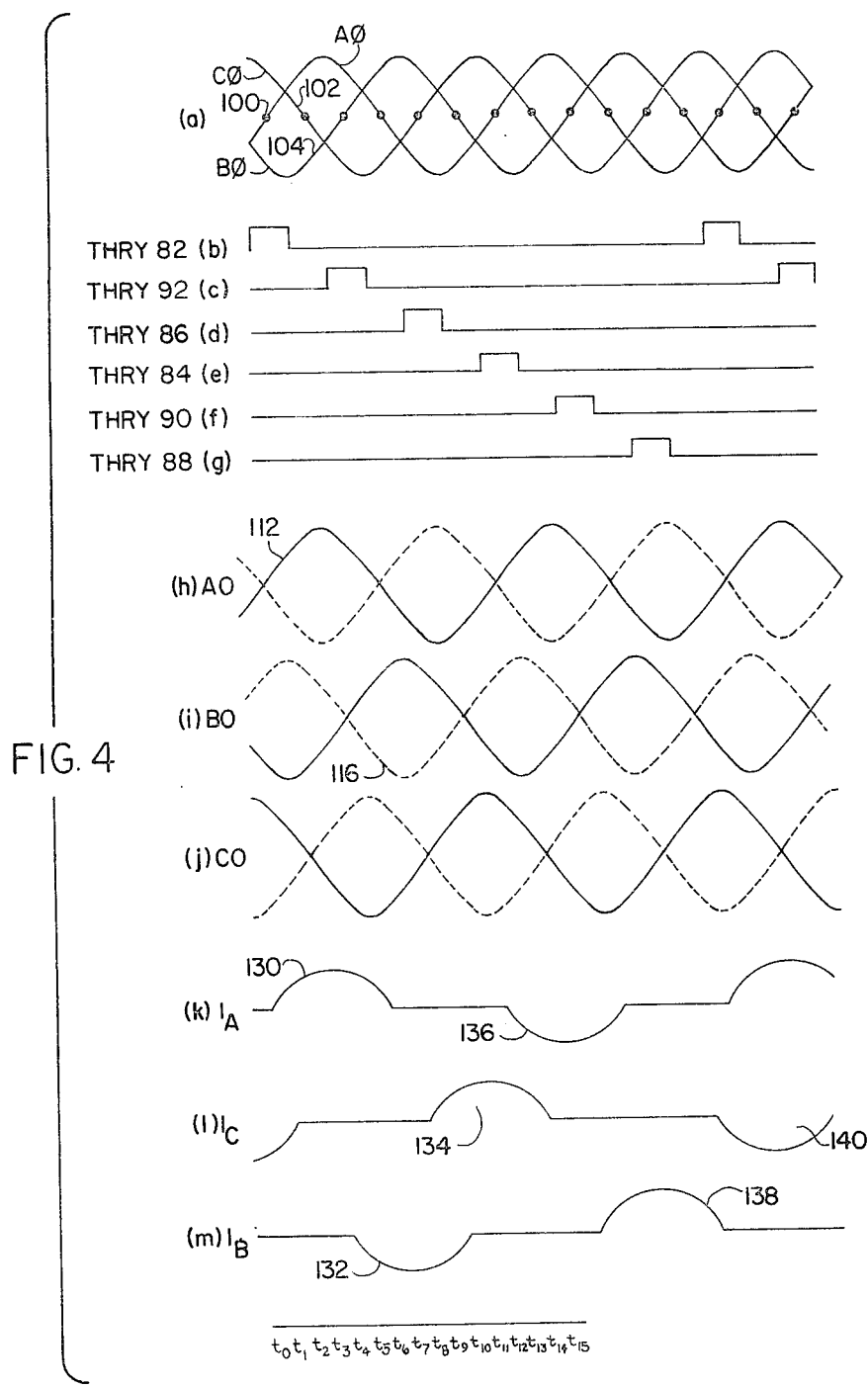
FIG. 4 is a graph illustrating the waveforms at various points in the schematic embodiment shown in FIG. 1.

Another novel aspect of the present invention relates to the firing order of the optically-triggered thyristors. The firing order is related to the sequence or order of the thyristors around the circumference of the cylinder 54. As is best seen in FIG. 3, the optically-triggered thyristors are positioned so that the firing order is, in sequence, thyristor 82, thyristor 92, thyristor 86, thyristor 84, thyristor 90, and thyristor 88. This enables the thyristors in the sequence as shown in FIG. 4 (b) through (g). With a light pulse striking a thyristor as a cathode-to-anode voltage across each thyristor goes positive, the thyristor immediately transitions to the conducting state. For example, the thyristor is presented with a light pulse at time $t_0$ so that by time $t_1$ when the cathode-to-anode voltage across it goes positive, the thyristor 82 immediately transitions to the conducting state. A one-half cycle of the 60 Hertz input voltage waveform on the line 10 (waveform 112 in illustration (h) of FIG. 4)) is presented to the terminal 81 of the induction motor 80. By time $t_2$ the slit 58 is no longer aligned between the light source 60 and the thyristor 82; however, since the thyristor 82 already has a current therethrough it does not change to its nonconducting state until the current (pulse 130 in illustration (k) of FIG. 4)) has been reduced to zero, i.e., at time $t_7$.

In a similar fashion, at time $t_4$, the optical thyristor 92 is presented with a pulse of light from the light source 60. This allows the thyristor 92 to transition to its conducting state at time $t_6$ when the cathode-to-anode voltage goes positive and waveform 116 is presented to the induction motor 80. In turn, a current pulse 132 (FIG. 4 (m)) is presented to the motor terminal 83. As will be appreciated by one of ordinary skill, as each thyristor in the firing order is sequentially triggered into conduction, a corresponding current pulse will pass through the windings of the motor 80 as shown in illustrations (k) through (m).

A particular feature of the speed reduction circuit according to the present invention is that an induction motor can be operated at half speed without reflecting a significant radio interference back into the power lines. Radio frequency interference can occur if a solid state switch is transitioned to its conducting state with a forward voltage thereacross allowing a high instantaneous current surge. The circuit configuration of the present invention prevents this occurrence by enabling each thyristor approximately 30 electrical degrees before the cathode-to-anode voltage goes positive.

Although this invention has been shown and described with respect to a preferred embodiment, it will be understood by those skilled in this art that various changes in form and detail thereof may be made without departing from the spirit and scope of the claimed invention.

We claim:

1. A half-frequency AC converter positionable between a three-phase source of electrical energy and a three-phase motor comprising:
   a three-phase transformer means connected to said source of electrical energy for reducing the magnitude of an incoming voltage waveform, and for providing a secondary voltage waveform having an in-phase component and out-of-phase component;
   a plurality of optically-triggered switch elements connected between the output of said three-phase transformer and said three-phase motor, each of said switch elements being transitionable between a nonconducting state and a conducting state by the presentation thereto of a suitable pulse of light energy together with a properly polarized voltage waveform; and
   optical trigger means synchronously coupled to the incoming voltage waveform for providing a sequence of spaced light pulses for enabling said switch elements in a predetermined sequence, allowing selected ones of said in-phase components and out-of-phase components to produce a half-frequency voltage waveform to be presented to said three-phase motor, causing it to operate at half speed.

2. A half-frequency AC converter according to claim 1, wherein said optical trigger means includes a synchronous motor coupled to said three-phase energy source, and further including a cylindrical means having a sidewall with an axially extending slit therethrough forming an aperture.

3. A half-frequency AC converter according to claim 2, wherein said optically-triggered switch means are circumferentially positioned about said cylinder means in a predetermined manner, and further including a source of light energy located within said cylinder means so that when said cylinder is rotated in synchronism with said incoming voltage waveform said plurality of optically-triggered switch elements are enabled in a predetermined order.

4. A half-frequency AC converter according to claim 1, wherein said three-phase transformer includes secondary windings, and wherein said switch elements are connected in a anti-parallel configuration across each secondary winding and one terminal of said three-phase motor.

5. A half-frequency AC converter circuit according to claim 4, wherein each secondary winding of said three-phase transformer includes a center-tap, and wherein each center-tap is connected directly to one terminal of said motor.

* * * * *